(12) United States Patent
Buchmann et al.

(10) Patent No.: US 10,275,495 B2
(45) Date of Patent: *Apr. 30, 2019

(54) USER-DEPENDENT RANKING OF DATA ITEMS

(71) Applicant: SAP SE, Walldorf (DE)

(72) Inventors: Daniel Buchmann, Karlsruhe (DE); Frank Michels, Speyer (DE)

(73) Assignee: SAP SE, Walldorf (DE)

( * ) Notice: Subject to any disclaimer, the term of this patent is extended or adjusted under 35 U.S.C. 154(b) by 675 days.

This patent is subject to a terminal disclaimer.

(21) Appl. No.: 14/951,278

(22) Filed: Nov. 24, 2015

(65) Prior Publication Data

US 2017/0147580 A1    May 25, 2017

(51) Int. Cl.
*G06F 17/30* (2006.01)

(52) U.S. Cl.
CPC .... *G06F 17/3053* (2013.01); *G06F 17/30528* (2013.01)

(58) Field of Classification Search
CPC ..................... G06F 17/3053; G06F 17/30477
USPC ........................................................ 707/723
See application file for complete search history.

(56) References Cited

U.S. PATENT DOCUMENTS

| | | | |
|---|---|---|---|
| 8,898,175 B2 * | 11/2014 | Zenger | G06F 17/30445 707/748 |
| 2008/0016053 A1 | 1/2008 | Frieden et al. | |
| 2013/0173605 A1 * | 7/2013 | Dou | G06F 17/30705 707/723 |
| 2015/0234827 A1 * | 8/2015 | Lin | G06F 17/3053 707/729 |
| 2016/0323398 A1 * | 11/2016 | Guo | G06Q 10/06311 |
| 2017/0147582 A1 | 5/2017 | Michels et al. | |
| 2017/0147583 A1 | 5/2017 | Buchmann et al. | |

(Continued)

OTHER PUBLICATIONS

Xin et al., "Answering Top-k Queries with Multi-Dimensional Selections: The Ranking Cube Approach"; VLDB '06, Sep. 12-15, 2006; 12 pages.*

(Continued)

*Primary Examiner* — Monica M Pyo
(74) *Attorney, Agent, or Firm* — Schwegman Lundberg & Woessner, P.A.

(57) ABSTRACT

Methods, systems, and computer program products for ranking data items are described. In accordance with various example embodiments, a ranking configuration is defined for an object type, the ranking configuration comprising an assignment of one or more ranking dimensions each comprising one or more object attributes to the object type and, for each of the one or more assigned ranking dimensions, one or more corresponding values and a significance weight assigned to each value, at least one of values being a dynamic value corresponding to the context-based object attribute. A ranking condition is generated for each ranking dimension assigned to the object type. The generation of the ranking condition is based at least in part on one or more object attributes, a specified ranking-impact weight, a context value corresponding to the context-based object attribute, and the one or more values and associated significance weights. A database query for data objects of the specified object type and comprising the generated ranking condition is generated.

18 Claims, 10 Drawing Sheets

(56) References Cited

U.S. PATENT DOCUMENTS

2017/0147584 A1   5/2017   Buchmann

OTHER PUBLICATIONS

"U.S. Appl. No. 14/951,291, Examiner Interview Summary dated Aug. 7, 2018", 3 pgs.
"U.S. Appl. No. 14/951,291, Non Final Office Action dated Jun. 27, 2018", 23 pgs.
"U.S. Appl. No. 14/951,291, Response filed Aug. 22, 2018 to Non Final Office Action dated Jun. 27, 2018", 17 pgs.
"U.S. Appl. No. 14/951,296, Non Final Office Action dated Jun. 27, 2018", 9 pgs.
"U.S. Appl. No. 14/951,315, Non Final Office Action dated Jun. 28, 2018", 10 pgs.
"Ranking Your Results: using Rank, Dense Rank and Row-Number", [Online] Retrieved from the internet: <http://moinne.com/blog/ronald/oracle/ranking-your-results-using-rank-dense_rank-and-row_number>, (Jun. 3, 2010), 7 pgs.

* cited by examiner

| Location | Employee | Work Area | ObjectID | Product | Amount |
|---|---|---|---|---|---|
| TX | User A | Purchases | 4 | Potatotes | $275 |
| TX | User A | Sales | 4 | Grass | $100 |
| MN | User A | Purchases | 5 | Grass | $55 |
| NE | User A | Sales | 5 | Potatoes | $275 |
| NE | User B | Purchases | 6 | Apples | $54 |
| France | User C | Contracts | 88 | Tulips | $55 |
| MN | User A | Contracts | 99 | Grass | $275 |
| MI | User A | Sales | 217 | Apples | $275 |
| MI | User A | Purchases | 217 | Tulips | $55 |
| MN | User A | Sales | 317 | Tulips | $54 |
| France | User A | Purchases | 317 | Apples | $54 |

FIG. 9A

| Location | Employee | Work Area | ObjectID | Product | Amount |
|---|---|---|---|---|---|
| MI | User A | Sales | 217 | Apples | $275 |
| MN | User A | Sales | 317 | Tulips | $54 |
| TX | User A | Sales | 4 | Grass | $100 |
| NE | User A | Sales | 5 | Potatoes | $275 |
| France | User A | Purchases | 317 | Apples | $54 |
| MI | User A | Purchases | 217 | Tulips | $55 |
| MN | User A | Purchases | 5 | Grass | $55 |
| TX | User A | Purchases | 4 | Potatoes | $275 |
| NE | User B | Purchases | 6 | Apples | $54 |
| France | User C | Contracts | 88 | Tulips | $55 |
| MN | User A | Contracts | 99 | Grass | $275 |

FIG. 9B

USER-DEPENDENT RANKING OF DATA ITEMS

CROSS-REFERENCE TO RELATED APPLICATIONS

The present application is related to U.S. patent applications entitled "Ranking Based on Object Data" (application Ser. No. 14/951,291), "Ranking Using Data of Continuous Scales" (application Ser. No. 14/951,296 and "Ranking Based on Dynamic Contextual Information" (application Ser. No. 14/951,315), all filed on Nov. 24, 2015. The disclosures of these three related applications are incorporated herein by reference in their entireties.

FIELD

The present disclosure relates generally to a mechanism for ranking data items. In an example embodiment, the disclosure relates to a mechanism for ranking data items retrieved from a database in a search result list.

BACKGROUND

Ranking data items is an important task of many applications, especially in scenarios where the number of data items being processed is large. Ranking may be used to organize a predefined set of data items, such as ranking a list of automobiles manufactured in the United States according to cost or reliability, or ranking a dynamic set of data items, such as ranking the items of a search result set. For example, searching for clothes available online for sale often returns an unmanageably large set of articles. Ranking the items by, for example, relevance to a user's search query can be as important as identifying the items based on the search terms.

BRIEF DESCRIPTION OF DRAWINGS

The present disclosure is illustrated by way of example and not limitation in the figures of the accompanying drawings, in which like references indicate similar elements and in which:

FIGS. 9A and 9B illustrates unranked and ranked example query results, in accordance with an example embodiment;

DETAILED DESCRIPTION

Figure 1A:
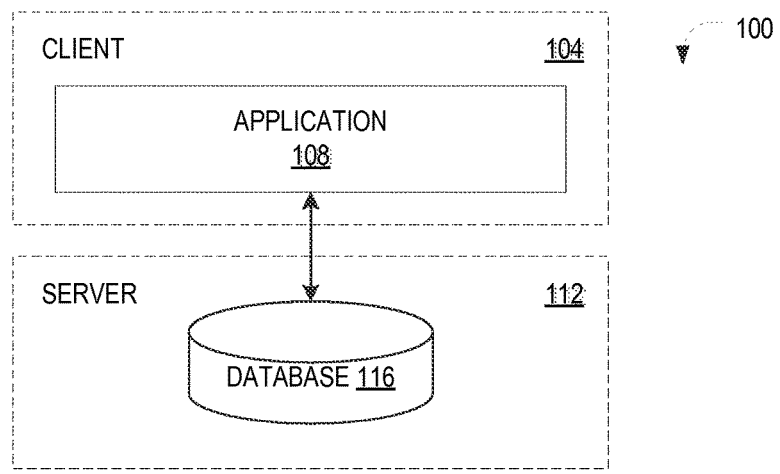
FIGS. 1A and 1B are schematic diagrams of example computing systems in the context of which approaches for ranking data objects in accordance with various embodiments may be implemented.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Generally, methods, systems, apparatus, and computer program products for performing ranking of data items are described. In various example embodiments, the data items include structured data in the form of data objects each including one or more object attributes, e.g., as are commonly stored in a database as database records, and the ranking is based at least in part on the object data itself. For instance, in one example embodiment, a ranking configuration specifies values of object attributes that cause a data object to be ranked higher than others. Considering, as an application example, product data used in a procurement application, data objects corresponding to products with lower prices, or products offered by a specified preferred vendor, may be ranked higher. In accordance with some embodiments, ranking based on the object data can be seamlessly combined with ranking based on other criteria. For example, in a search result list responsive to one or more (e.g., user-supplied) search terms, data objects may be ranked based on a combination of their relevancy to the search term(s) (e.g., matches between the object attributes and the search terms) and one or more boosting conditions that apply to the object attributes themselves (regardless of the search terms). To illustrate by way of example, when ranking data objects retrieved, in response to a search request by a particular user, from a database shared by many users, data objects associated with the particular user in one or more object attributes (e.g., an attribute specifying who created or last modified the data object) may be boosted, that is, increased in rank, in the search result list.

The disclosed methods, systems, apparatus, and computer program products may be universally applicable independent of application, data source, and data type. For example, predefined sets of data items, data items in a search result set, ad hoc lists of data items, and the like may be ranked. In addition, the data items may reside as data objects in a database, text in a file, data in a spreadsheet, information on a web site, and the like. The data items may also be ranked as they are dynamically created. While the following description focuses on the ranking of data objects in a database, which are inherently structured, it will be appreciated that data stored in other form (e.g., in flat files) may likewise be amenable to the ranking approach described herein. Data stored in text files, for instance, may be explicitly structured with tags of a suitable mark-up language (e.g., HyperText Markup Language (HTML)), or structurable by parsing, to ascertain the equivalent of object attributes as stored in database records.

Figure 1B:
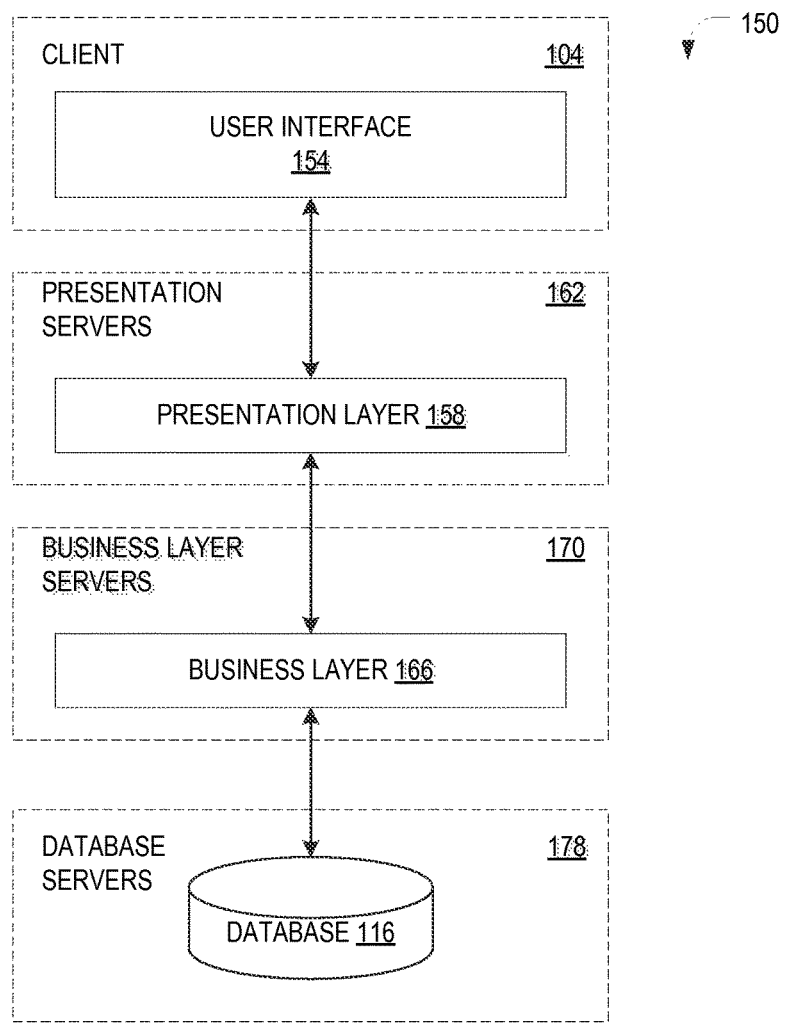

FIGS. 1A and 1B are schematic diagrams of example computing systems 100, 150 in the context of which approaches for ranking data objects in accordance with various embodiments may be implemented. Traditional client-server systems may employ a two-tiered architecture such as that illustrated by system 100 in FIG. 1A. An application 108 executed on a client device 104 of the two-tiered architecture may be composed of a monolithic set of program code including a graphical user interface component, presentation logic, business logic, and a network interface that enables the client device 104 to communicate over a network with one or more servers 112. A database 116 that may be maintained on the server(s) 112 provides non-volatile or "persistent" storage for the data accessed and/or processed by the application 108. Data objects, may be retrieved from the database 116, e.g., in response to a search query submitted via the application 108. In one example embodiment, the data objects in the search result set are ranked based on the object data, as described more fully below.

The "business logic" component of the application 108 may represent the core program code of the application 108, e.g., the rules governing the underlying business process (or other functionality) provided by the application 108. The "presentation logic" may describe the specific manner in which the results of the business logic are formatted for display on the user interface. The server 112 may include, in association with the database 116, a DBMS (not shown) including data access logic used by the business logic to store and retrieve data.

In response to limitations associated with the two-tiered client-server architecture, a multi-tiered architecture has been developed, as illustrated in FIG. 1B. In the system 150, a presentation layer 158, business layer 166, and the database 116 may be logically separated from a user interface 154 of the client device 104. These layers may be moved off of the client device 104 to one or more dedicated servers on the network. For example, the presentation layer 158, the business layer 166, and the database 116 may each be maintained on separate servers (e.g., presentation servers 162, business layer servers 170, and database servers 178).

This separation of logical components from the user interface 154 may provide a more flexible and scalable architecture compared to that provided by the two-tiered model of the system 100 in FIG. 1A. For example, the separation may ensure that all clients share a single implementation of the business layer 166. If business rules change, changing the current implementation of the business layer 166 to a new version may not call for updating any client-side program code. In addition, the presentation layer 158 may be provided, which generates code for a variety of different user interfaces 154, which may be standard browsers.

Figure 2:
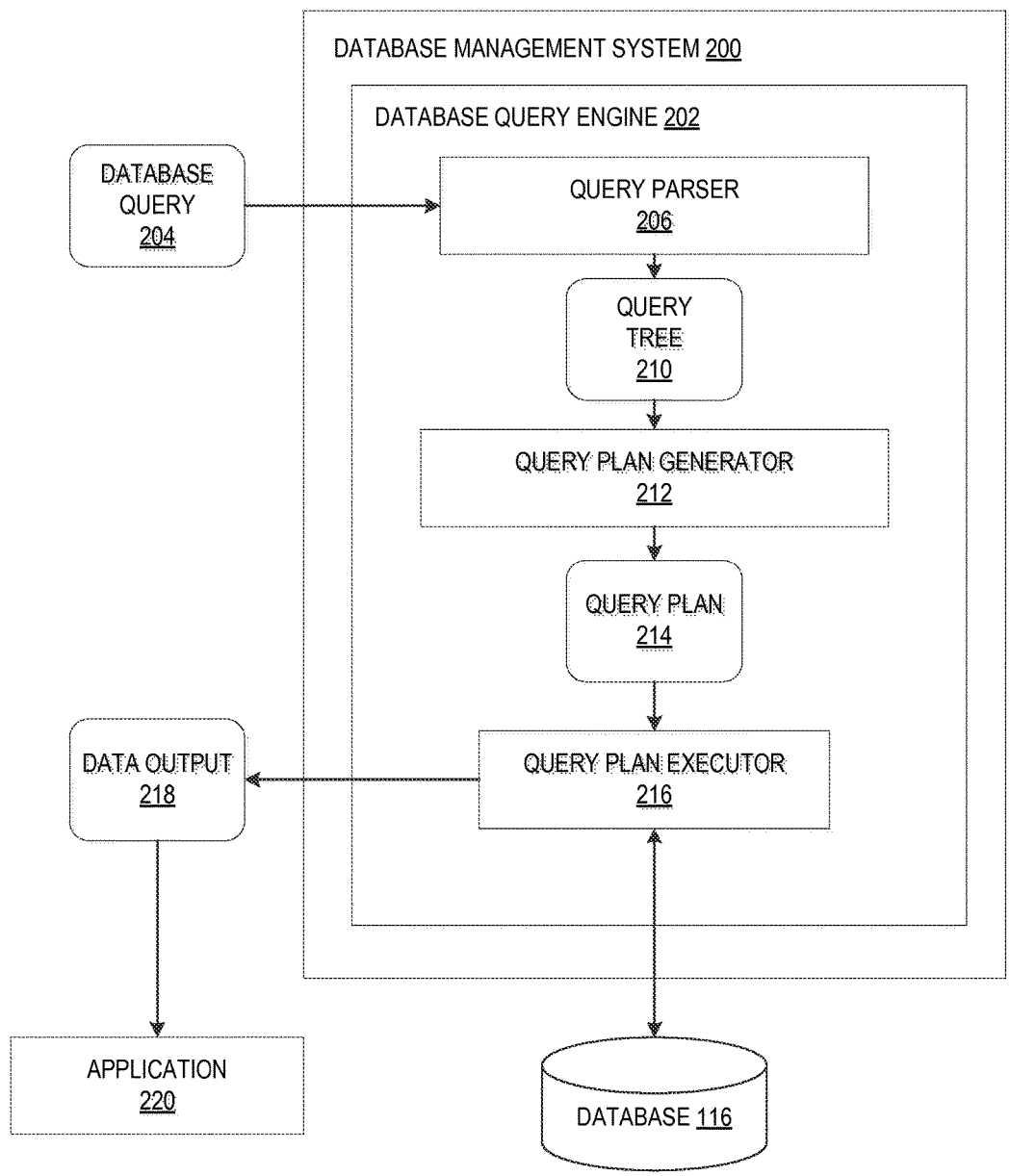
FIG. 2 is a data flow diagram illustrating the functioning of an example database management system (DBMS) for performing a query on a database and ranking the query results, in accordance with an example embodiment.

FIG. 2 is a data flow diagram illustrating the functioning of an example database management system (DBMS) 200 for performing a query on a database 116 and ranking the query results, in accordance with an example embodiment. The DBMS 200 may be implemented along with the database 116 on servers 112 or 178 of FIGS. 1A and 1B. From the perspective of the DBMS 200, an application accessing the database 112, whether this be, e.g., an application 108 running on a client device 104 in a two-tiered architecture or an application in the business layer 166 of a multi-tiered architecture, is a client. Accordingly, hereinafter, such an application will be considered client-side and generally referred to as a "database-accessing service module."

Figure 3:
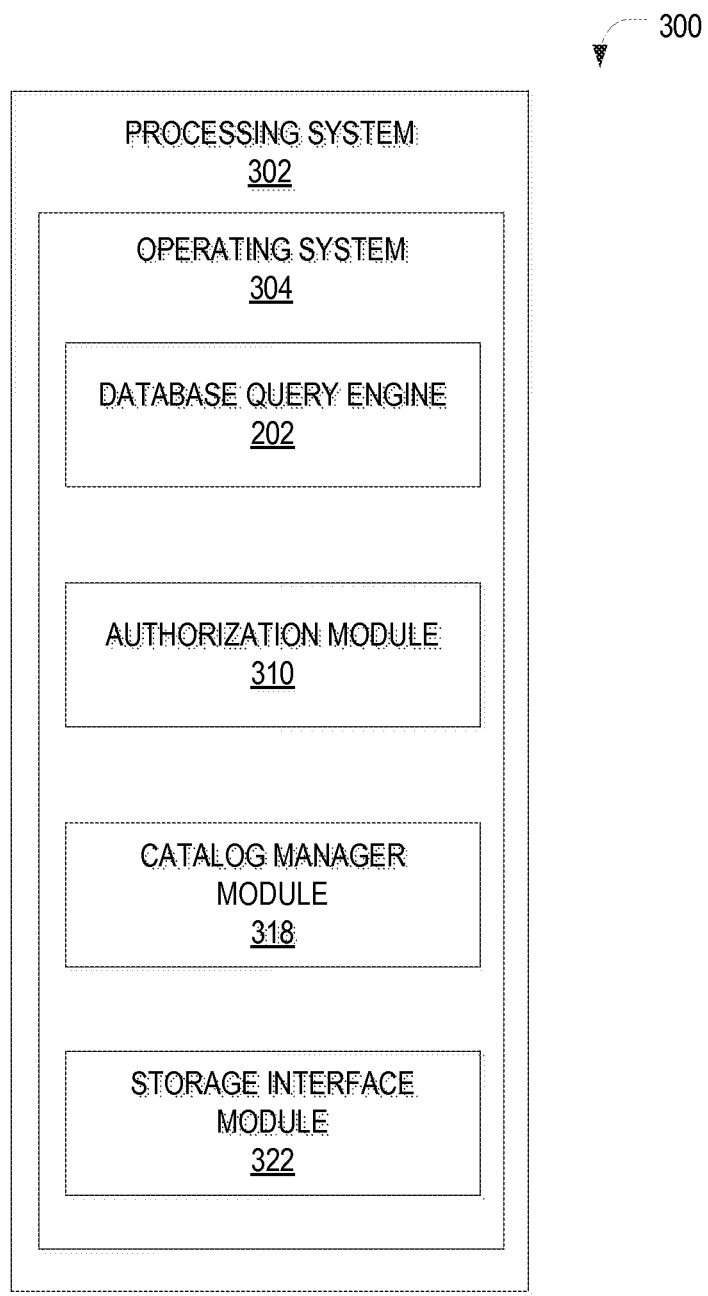
FIG. 3 is a block diagram of an example apparatus for executing database queries, in accordance with an example embodiment.

The DBMS 200 may include multiple software modules, illustrated in more detail in FIG. 3, for providing functionality for, e.g., managing database schemata, facilitating read and/or write access to the database 116 by client applications, and/or enforcing user authentication and authorization policies. In an example embodiment, the same user can be authorized to access and/or execute database entities, such as tables, procedures, views, and the like. The DBMS 200 may also maintain information regarding the searching and ranking processes. For example, the DBMS 200 may maintain information indicating whether a ranking process is running or is stopped. As illustrated, the DBMS 200 includes a database query engine 202 that can receive and process database queries 204 (illustrated in FIG. 2, like other types of data passed between the system components, with rounded rectangles). The database query engine 202 may, for instance, be a Structured Query Language (SQL) engine that can process SQL statements such as SELECT statements, as are commonly used to retrieve data objects from databases. While the present disclosure relates, in particular, to read-access to the database 116 (i.e., queries for retrieving data objects), an SQL engine generally also allows processing statements for writing to the database by inserting new or modifying existing data objects.

The database query engine 202 may include a query parser 206 to create a parsed query from the incoming query 204, and further to decompose the parsed query into a network of operators, with each operator representing an atomic processing block. The parsed query may then be represented as a directed, acyclic graph (DAG), or "query tree" 210. The query tree 210 is passed to a query plan generator 212, which can generate a query plan 214 by analyzing possible combinations of operations to execute the query and selecting an efficient one. The resulting query plan 214 may be converted into code and forwarded to a query plan executor 216 for execution. The query plan executor 216 can then utilize the converted query plan 214 to obtain appropriate data responsive to the database query 204 from the database 216. The data output 218 from the database 116 can be returned to the requesting application or resource 220 (or some other specified destination), which may be, e.g., an operational applications spreadsheet or visualization application, or reporting/business intelligence tools.

FIG. 3 is a block diagram of an example apparatus 300 for executing database queries, in accordance with an example embodiment. The DBMS 200 of FIG. 2 may implemented, e.g., using this apparatus 300. The apparatus 300 is shown to include a processing system 302 that generally includes hardware such as, for example, one or more processors, volatile and non-volatile memory, device interfaces (e.g., for network and input/output devices), and a system bus connecting the various components. An operating system 304 running on the processing system 302 facilitates executing software instructions by mediating between multiple higher-level program modules and the hardware components. In accordance with an example embodiment, these program modules may include the database query engine 202, an authorization module 310, a catalog manager module 318 for managing database schemata and metadata in a database catalog, and a storage interface module 322 providing access to various storage elements, such as the column stores and catalog(s) of the DBMS 200. The database query engine 202, before parsing, converting, and executing a received database query, may issue an authorization check to the authorization module 310 in order to confirm that the user is authorized to perform, for example, the requested search and ranking tasks. The authorization module 310, upon checking whether a user is authorized to request a particular action, issues authorization messages to other entities, such as the database query engine 202.

Figure 4:
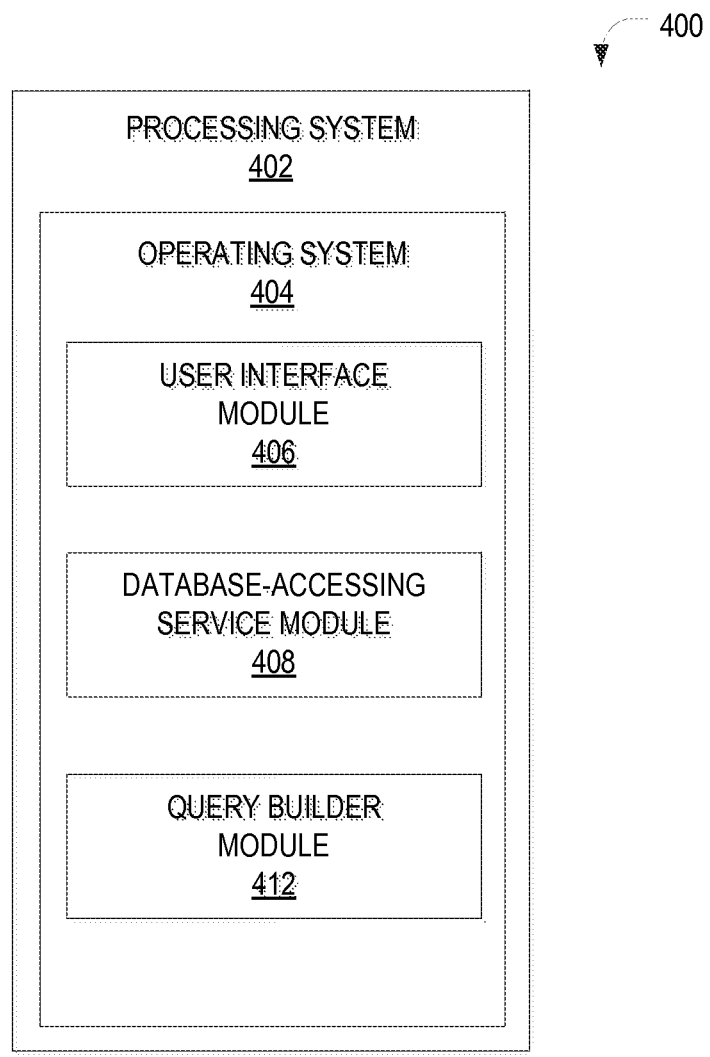
FIG. 4 is a block diagram of an example apparatus for generating a database query, in accordance with an example embodiment.

FIG. 4 is a block diagram of an example apparatus 400 for generating a database query 204, in accordance with an example embodiment. The apparatus 400 is shown to include a processing system 402 that generally includes hardware such as, for example, one or more processors, volatile and non-volatile memory, device interfaces (e.g., for network and input/output devices), and a system bus connecting the various components. The processing system 402 may be implemented, e.g., on the client device 104 of FIG. 1A or in parts on the client device 104 and the presentation and business layer servers 162, 170 of FIG. 1B. The apparatus 400 includes an operating system 404 for executing software instructions of various higher-level program modules. In accordance with an example embodiment, these program modules may include a user interface module 406, a database-accessing service module 408, and a query builder module 412.

The user interface module 406 provides an interface for a user to submit a database query 204 to thereby initiate the retrieval and ranking of data items. In one example embodiment, the user interface module 406 enables a user to initiate a search of data objects in the database 116, as described more fully below. The user may explicitly search for certain data by entering one or more search terms and/or other search criteria (e.g., an object type of interest).

The database-accessing service module 408 may be an application programming interface (API) that receives the user input as a search request and forwards it to the query builder module 412 to cause a database query 204 to be generated and executed in order to service the search request. In another embodiment, the database-accessing service module 408 is an application that automatically initiates a database access, e.g., to populate data fields in a user interface upon log-in of a user, or to retrieve data used to process a request for service from another application in a services-oriented architecture.

The query builder module 412 generates, based on a database-access request, a database query 204 in a query language understood by the database query engine 202. The query language may, for example, be SQL, which facilitates data retrieval from a database via SELECT statements.

Figure 5:
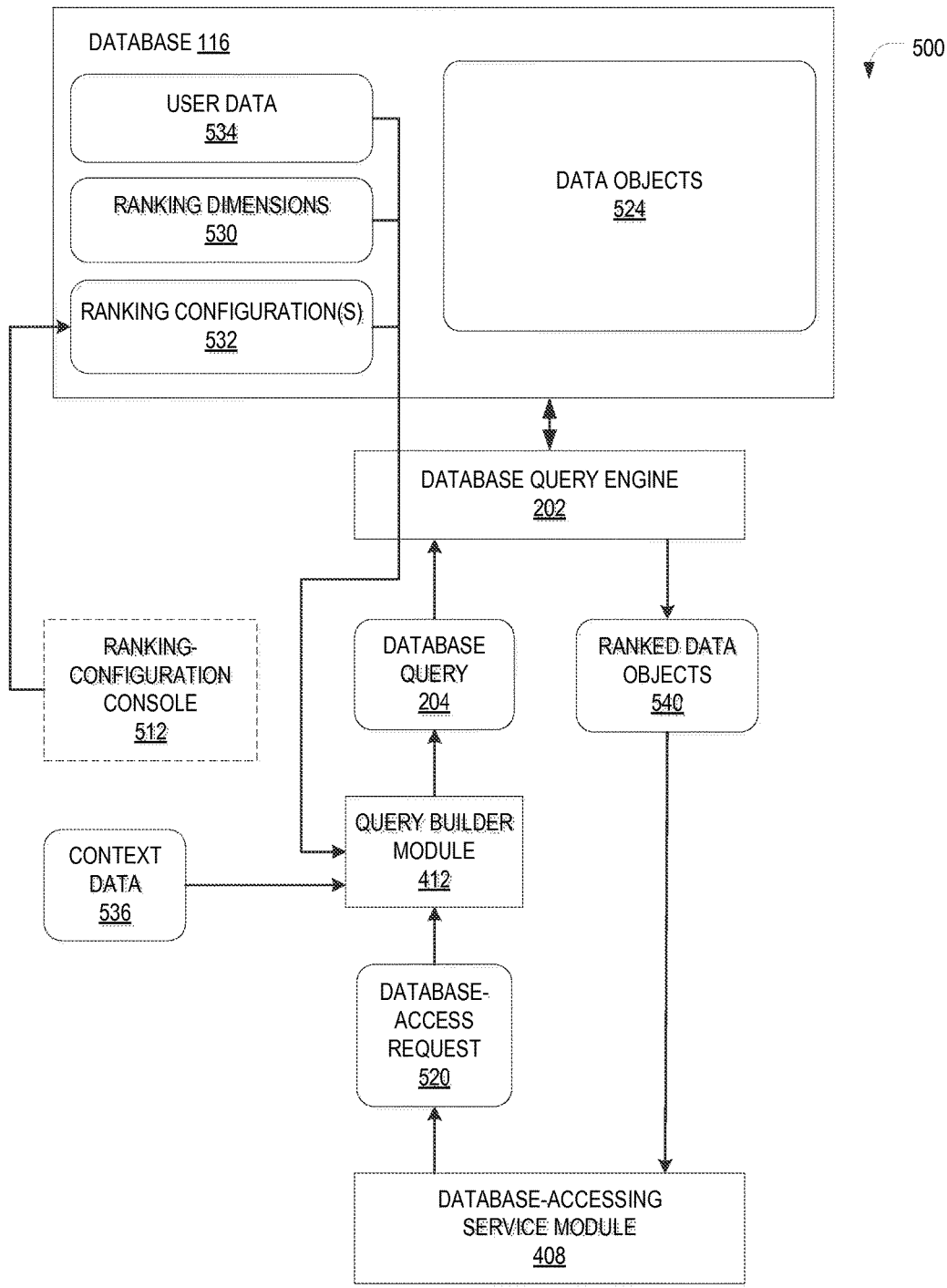
FIG. 5 is a data flow diagram for an example system for ranking data objects retrieved from a database, in accordance with an example embodiment.

FIG. 5 is a data flow diagram for an example system 500 for ranking data objects retrieved from a database 116, in accordance with various embodiments, illustrating the data (depicted with rounded rectangles) flowing between the various system components (depicted with sharp rectangles). The system 500 includes, in addition to the database 116, a plurality of functional modules, such as the query builder module 412, the database query engine 202, the database-accessing service module 408, and a ranking-configuration console 512; these modules may be implemented, for example, as software modules executing on one or more computing devices such as, e.g., the apparatus 300 and 400 of FIGS. 3 and 4, or some other implementation of client and/or server devices 104, 112, 162, 170, 178. For example, the database 116 and database query engine 202 a database server separate from the machine on which the database-accessing service module 408 (the client, from the database server's perspective) resides. The query builder module 412 as well as the ranking-configuration console 512 may each be implemented server-side or client-side (depending, e.g., on application details as explained below). The query builder module 412 mediates between the database-accessing service module 408 and the database query engine 202 by converting a database-access request 520 from the database-accessing service module 408 into a database query 204 suitable for execution by the database query engine 202. If implemented client-side, the query builder module 412 may be an integral part of the database-accessing service module 408 or, alternatively, a separate module in communication with the database-accessing service module 408 (or with multiple database-accessing services modules 408), as illustrated in FIG. 4.

The database 116 stores a plurality (usually a large number) of data objects 524 of, generally, various object types. For example, a database for a business may store data for different types of business objects representing different respective types of business entities, such as employees, departments, projects, products, transactions, materials, suppliers, cost and expense items, and the like. This data may be organized in multiple tables corresponding to the different respective object types. Within a given table, each data record, or row, corresponds to an individual data object, and generally includes a key uniquely identifying the data object as well as one or more data object attributes. For instance, in a table storing employee data, the first column may store a unique identification number for each employee, and further columns may store the employee's name, job title, date of hire, office location, email address, telephone number, and/or any other employee-specific data of interest. Since the key and object attributes are functionally equivalent for purposes of filtering and/or ranking data objects in accordance herewith, the terms "object attribute" and "attribute" are hereinafter meant to include both keys and non-key attributes, unless otherwise noted or apparent from context. Also, for purposes of this disclosure, the term "table" is intended to include not only the persistent base tables created in accordance with the physical schema underlying the database, but also virtual tables corresponding to views (as the term is understood in the art) created by joining data from multiple base tables. Furthermore, each base table itself may include an anchor table representing a particular object type and one or more additional tables, included by way of joining, that hold attributes related to various aspects of the object type.

Data retrieval from the database 116 may be triggered manually or automatically under various circumstances, depending on the kind of database-accessing service module 408. For example, in accordance with one example embodiment, a user may explicitly search for certain data by entering one or more search terms and/or other search criteria (e.g., an object type of interest) via a suitable search user interface, such as a user interface provided the by user interface module 406. In this case, the database-accessing service module 408 may be an API that receives the user input as a search request and forwards it to the query builder module 412 to cause a database query 208 to be generated and executed to service the search request. In another embodiment, the database-accessing service module 408 is an application that automatically initiates a database access, e.g., to populate data fields in a user interface upon log-in of a user, or to retrieve data used to process a request for service from another application in a services-oriented architecture. User-initiated search requests and program-internally created data requests are both examples of "database-access requests," as the term is used herein.

The query builder module 412 generates, based on the database-access request 520, the database query 204 in a query language understood by the database query engine 202. The query language may, for example, be SQL, which facilitates data retrieval from a database via SELECT statements. The database query 204 may specify, as the source of the data, one or more of the tables in the database 116, corresponding to one or more object types specified in the database-access request 520. In case of a search request from a user, for example, the object type(s) may be indicated explicitly as search criteria, or inferred from the search terms. If the database-access request 520 does not specify any object types, a default rule may cause all tables to be searched. The data objects within the specified tables can be filtered based on various conditions included in the query (e.g., implemented as WHERE conditions in a SELECT statement). For example, a database query 204 generated based on a search request including a search term may include a condition that the retrieved data objects include the search term in any of their object attributes.

In addition, in accordance with various embodiments, the database query 204 may include conditions for ranking the data objects based on the object attributes themselves (independently of any search terms). The ranking conditions may be created by the query builder module 412 based on stored ranking dimensions 530 and ranking configurations 532, optionally in conjunction with other data, such as user data 534 or context data 536. The ranking configurations 532 may be created manually, e.g., via the ranking-configuration console 512, or programmatically. The ranking dimensions 530, ranking configurations 532, and user data 534 may be stored in the database 116, as shown. Alternatively, they may be stored in whole or in part in one or more separate data repositories. In either case, they are stored in a manner directly or indirectly accessible by the query-builder module 412. In further example embodiments, the ranking dimensions 530, ranking configuration 532, and/or user data 534 are stored client-side and selectively passed to the query-builder module 412 along with the database-access request 520. The context data 536 reflects various parameters measured subsequent to creation of the ranking configuration, e.g., at the time the database-access request 520 is issued, such as the user's current geographic location or the time of day, and is, accordingly, supplied to the query builder module 412 at runtime. The context data 536 may originate server-side or client-side.

Database queries 204 generated by the query builder module 412 can be executed by the database query engine 202. The database query engine 202 may be, e.g., a suitable commercially available query engine (e.g., a regular SQL engine), or a customized enhancement thereof, and may be provided as part of a DBMS associated with the database 116 (e.g., DBMS 200). The database query engine 202 may have inherent functionality not only for retrieving data objects in accordance with a SELECT statement, but also for ranking them in accordance with suitably formatted, weighted WHERE conditions (as explained in more detail below). Following execution of the database query 204, the database query engine 202 returns the ranked data objects 540 to the database-accessing service module 408.

A "ranking dimension," as used herein, is a data entity (e.g., if stored in the database 116, a data object of type "ranking dimension") which specifies one or more object attributes that can (collectively) serve as a criterion for ranking data objects retrieved in response to a database-access request 520. Data objects may, for instance, be ranked based on the user with which they are associated, as reflected in an object attribute that identifies the user, such as a numerical identifier or user name. As another example, data objects may be ranked based on the recency of their creation or latest update, which may be reflected in a time stamp stored as an object attribute. Further example ranking dimensions include, without limitation, the status of a data object (e.g., active, archived), the status of an action or project (e.g., approved, pending, in progress, completed), a department or cost center associated with a data object, or a target date for release or shipment of a product, to name just a few. Data objects may even be ranked directly based on their keys, which is meaningful in situations where certain object keys to be boosted are determined dynamically based on criteria outside the scope of the object data (such as, e.g., click counters that quantify the frequency of user access to the objects). As will be apparent from these examples, some ranking dimensions (such as the object key) may be generally applicable to all object types, whereas others (such as a sales order status) may apply to only a subset of one or more (but less than all) object types, depending on the types of object attributes available for different object types. To avoid replicating ranking dimensions that are applicable to multiple object types, the ranking dimensions 530 are stored, in accordance with various embodiments, separately from their assignment to the various object types. Further, since the attribute names used by different objects types for the semantically same object attribute can differ, a mapping between the attribute name as specified in the ranking dimension and the attribute names as used in the various object types may be stored, e.g., as part of the ranking dimension or in association therewith, or in the ranking configurations.

A "ranking configuration," as used herein, is a data entity that assigns one or more ranking dimensions 530 to a given object type, and further lists values of the object attributes specified in the assigned ranking dimensions 530 that, if assumed by a data object of that type, are to affect the ranking, e.g., by "boosting" that data object to a higher rank (an thereby implicitly lowering one or more other data objects in rank). For a given set of (one or more) object attributes, multiple sets of (one or more respective) values may be specified, each set with an associated significance weight that quantifies how much the data object matching the specified set of values is to be boosted or lowered, as the case may be. (The terms "set of object attributes" and "set of values" herein encompass both single attributes and values as well as attribute and value tuples.) Furthermore, the ranking configuration may include, for each ranking dimension, an associated ranking-impact weight to define the relative impact of one ranking dimension versus another (if multiple ranking dimensions are assigned to an object type) as well as the relative impact of object-attribute-based ranking versus other kinds of possible ranking conditions (such as, e.g., ranking based on the occurrence of search terms in the data objects). In one example embodiment, a significance weight corresponding to a set of one or more values may be multiplied by the corresponding ranking-impact weight to derive a single compound weight for the set of one or more values, where the compound weight accounts for both the significance weight and the ranking-impact weight. For example, a significance weight of 0.6 for a set of one or more values and a ranking-impact weight of 0.8 for the corresponding ranking dimension would result in a compound weight of 0.48.

Since the ranking configurations 532 are generally object-type-specific, the collection of ranking configurations may include multiple individual ranking configurations 532, e.g., one for each type of data objects 524 stored in the database 116, although object types may also be grouped for purposes of a ranking configuration if they all include the object attributes corresponding to the assigned ranking dimensions. Note, further, that a ranking configuration need not necessarily be specified for each existing object type; data objects of a type for which no configuration exists may simply not undergo any ranking adjustments or boosting. In various embodiments, the ranking configurations are, furthermore, specific to individual users or groups of users with similar data needs. Various user-specific ranking configurations may, for example, differ in the specified attribute values and/or the associated significance weights. In principle, it is also possible to allow data retrieved for different users to be ranked according to different dimensions and/or using different ranking-impact weights. In many circumstances, it will, however, be beneficial to assign dimensions and ranking-impact weights globally, and limit user-specific configurations to the attribute values and significance weights.

Figure 6:
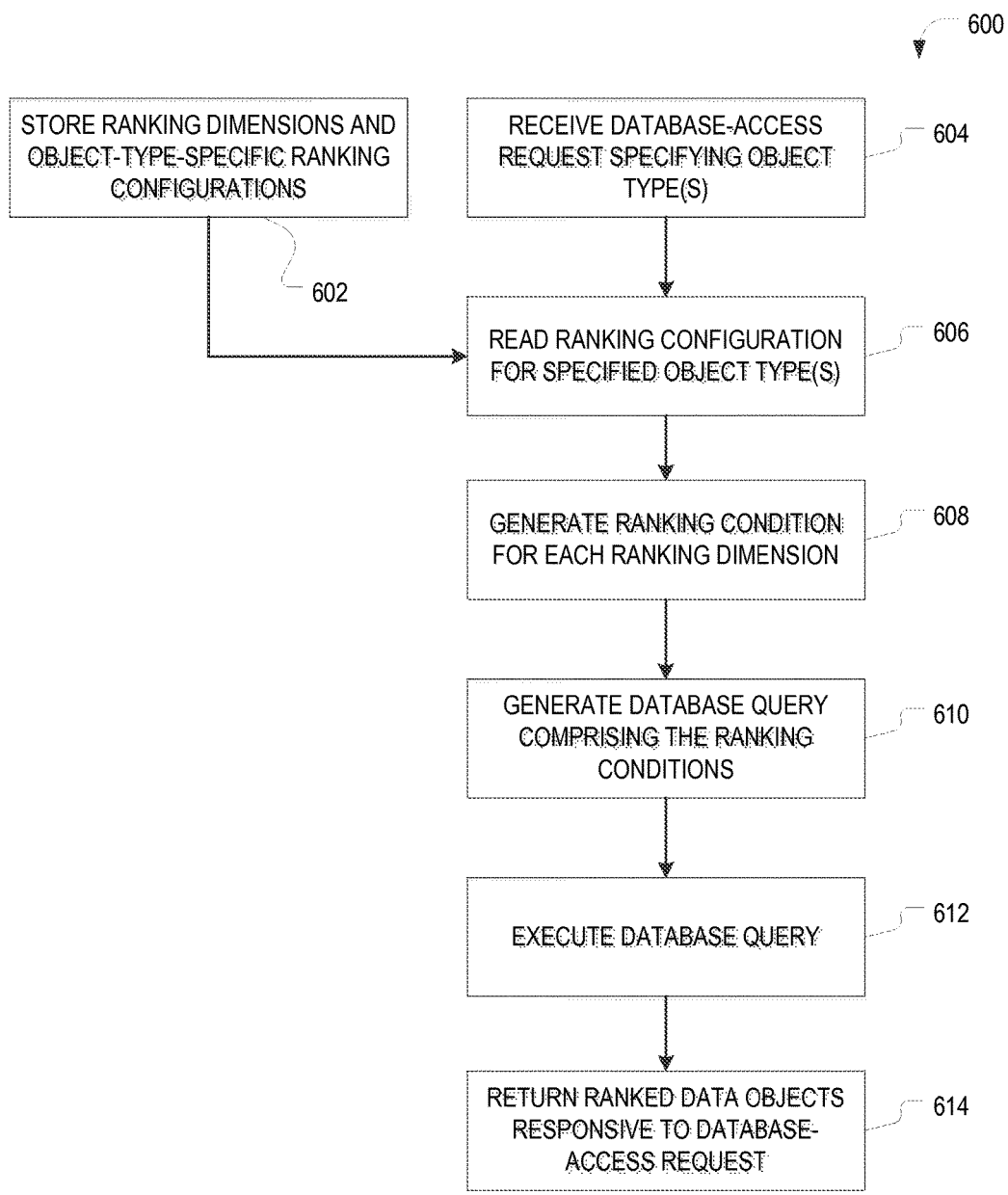
FIG. 6 is a flow chart of an example method, in accordance with various embodiments, for ranking data objects retrieved from a database based on object attributes.

FIG. 6 is a flow chart of an example method 600, in accordance with various embodiments, for ranking data objects retrieved from a database based on object attributes. The method 600 involves storing, in preparation for subsequent data-object rankings, ranking dimensions 530 and object-type-specific ranking configurations 532 (operation 602), e.g., as were defined using a configuration user interface of the ranking configuration console 512. The ranking dimensions 530 and ranking configuration 532 may be stored, for instance, in the database 116, accessible by the query builder module 412. Then, in response to receipt (at the query builder module 412, from the database-accessing service module 408) of a database-access request 520 specifying one or more data objects (operation 604), the stored ranking configuration(s) 532 for the specified object type(s), along with the associated dimension(s) 530, are read (operation 606). As described above, a user may explicitly search for certain data by entering one or more search terms and/or other search criteria via the user interface module 406. The search request may be received by the database-accessing service module 408, which generates the database-access request 520 therefrom. Alternatively, a database-access request 520 may be automatically initiated.

Then query builder module 412 creates a ranking condition for each assigned ranking dimension (operation 608), and generates a database query 204 from the database-access request 520 that includes these ranking conditions (operation 610). In accordance with some example embodiments, the database query 204 takes the form of a SELECT statement (a type of SQL statement used to retrieve data objects from a database), and the ranking conditions are included in the database query 204 as WHERE conditions. To illustrate, the general syntax of such a SELECT statement for a database-access request specifying a single object type is, in one example embodiment:

SELECT  FROM <object type> WHERE . . . ,
ORDER BY score DESC

For a ranking dimension 530 specifying a single attribute and an associated ranking configuration 532 specifying a single value that, if assumed by an object attribute, results in boosting, the WHERE condition may take the general form:

WHERE (<attribute>=<value1>[weight=<x>] OR<attribute> !=<value1>[weight=<y>])

To provide a specific example, in a search for data objects of type "product," results that list a specified preferred vendor in the vendor attribute may receive a boost:

SELECT  FROM Products WHERE (vendor="PreferredVendor" [weight=0.8] OR vendor !="PreferredVendor" [weight=0.1])

The WHERE condition is structured to specify a higher weight x (e.g., 0.8) if the attribute assumes the specified value (e.g., if the vendor attribute has value PreferredVendor), and a generally much lower weight y (e.g., set to 0.1) if the attribute does not assume the specified value. The inclusion of the complement serves to ensure that data objects otherwise responsive to the database-access request are not omitted from the results list simply because they do not meet the boosting condition, but are instead retained in the results list with merely a lower rank. The weights specified in the WHERE conditions may be compound weights computed as the product of the ranking-impact weight of the ranking dimension and the significance weight associated with the specified attribute value.

The ranking configuration 532 may specifying multiple values that result in different levels of boosting. In this case, the WHERE condition may include multiple disjunctively linked sub-conditions of the general form:

WHERE (<attribute>=<value1>[weight=<x1>] OR<attribute>=<value2>[weight=<x2>] OR . . . OR<attribute>!=<value1>[weight=<y>])

Continuing the above example, two specified vendors may be preferred over all others, one slightly more than the other:

WHERE (vendor="PreferredVendor1" [weight=0.8] OR vendor="PreferredVendor2" [weight=0.7] vendor!="PreferredVendor" [weight=0.1])

As will be appreciated, any number of attribute values and associated significance weights can in principle be specified in the ranking configuration.

The attributes according to which data objects are ranked may generally be discrete-valued or continuous-valued (or quasi-continuous-valued). For discrete-valued attributes, the ranking condition may include up to as many sub-conditions as there are values, plus the complement. For continuous-valued attributes, the value range may be discretized by defining classes thereon, and the values specified in the ranking configurations 532 may then reference one of the classes. In this manner, the case of continuous-valued object attributes can be reduced to the case of discrete-valued attributes. For example, when data objects are to be ranked based on their recency, as reflected in an object attribute storing a date (which has a quasi-continuous value range, considering the large number of possible dates), dates can be grouped by quarter (e.g., Q4 2105 Q1 2015, Q2, 2015, Q3 2015, and so on for the relevant date range). The WHERE condition may be, for example:

WHERE (quarter="Q4 2015" [weight=0.9] OR quarter="Q3 2015" [weight=0.8] OR quarter="Q2 2015" [weight=0.7] OR quarter !=("Q4 2015" OR "Q3 2015" or "Q2 2015") [weight=0.2])

In this case, evaluating the ranking condition involves mapping a certain date as stored in the data attribute onto the applicable quarter. For example, Aug. 14, 2015 would be mapped onto Q3 2015.

A ranking dimension need not be limited to a single object attribute, but may specify a set including multiple object attributes (or attribute tuple) that are used in combination to affect the ranking of object types:

WHERE ({<attribute1>, <attribute2>}={<value1>, <value2>} [weight=x] OR {<attribute1>, <attribute2>} !={<value1>, <value2>} [weight=y])

For example, in a search for persons (e.g., employees), the combination of first name and last name may be relevant to ranking:

```
SELECT  FROM Employees WHERE
    ({last_name, first_name}={"Miller", "Carl"}
    [weight=0.9] OR {last_name, first_name} !={"Miller",
    "Carl"} [weight=0.1])
```

As mentioned above, the ranking of data objects may be affected by multiple ranking dimensions with generally different ranking-impact weights (although, of course, the special case where the ranking impact weights assigned to two dimensions happen to be equal is not excluded). The query builder module 414 will generate a WHERE condition for each dimension, and then link the WHERE conditions conjunctively in the SELECT statement:

```
SELECT  FROM <object type> WHERE
    (<attribute1>=<value1>[weight=<x1>] OR<attribute1> !=
    <value1>[weight=<y1>]) AND WHERE
    (<attribute2>=<value2>[weight=<x2>] OR<attribute2> !=
    <value2>[weight=<y2>]))
```

For example, when searching for development projects, ranking may be based on a combination of the development phase and the target completion date, with projects further along in the development process or closer to the target date being ranked higher:

```
SELECT  FROM Projects WHERE
    (phase="testing" [weight=0.9] OR phase="implementation"
    [weight=0.7] or phase="planning" [weight=0.5] or
    phase !=("testing" OR "implementation" OR "planning")
    [weight=0.1]) AND WHERE
    (completion_target="ThisQuarter" [weight=0.5] OR
    completion_target="NextQuarter" [weight 0.3] OR completion_target !=("ThisQuarter" OR "NextQuarter")
    [weight=0.1])
```

When ranking is affected by multiple ranking dimensions, the relative ranking impacts of these dimensions come into play. In the above example, for instance, ranking based on the development phase may have ranking-impact weight 1.0, while ranking based on the target completion date may have ranking-impact weight 0.5. The significance weights for the phase values "testing," "implementation," and "planning" may be 0.9, 0.7, and 0.5, respectively. The significance weights for target completion targets "ThisQuarter" and "NextQuarter" may have significance weights 1.0 and 0.6, respectively; in conjunction with the ranking-impact weight of 0.5, this results in overall weights of 0.5 and 0.3, respectively.

In the database query, ranking based on object data and ranking configurations as described above may be combined with other kinds of ranking conditions, for example with ranking based on relevancy to search terms supplied by a user. In this case, the relevancy to the search terms can be captured in a separate WHERE condition, which may have its own associated weight that determines the relative impact of search-based ranking and object-data-based ranking, and may, for example, take the form:

```
SELECT  FROM <object type> WHERE CONTAINS
    (<attribute1>[weight=<y1>]<attribute2>
    [weight=<y2>], <search terms>])AND
    (<attribute>=<value1>[weight=<x>] OR<attribute> !=
    <value1>[weight=<y>]), ORDER BY score DESC
```

The weight associated with the relevancy to the search term(s) may be some metric of the fit between the search terms and the contents of the object data, and may be computed using, e.g., fuzzy search and/or term frequency/inverse document frequency (TF/IDF), or other relevancy-based concepts known to those of ordinary skill in the art. In one embodiment, data items that do not meet the criteria of a fuzzy rule set are excluded from the search result set.

With renewed reference to FIG. 6, once the database query including the proper ranking conditions has been generated in operation 608, the database query 522 is passed on to the query engine 506, where it is executed (operation 610). Execution involves retrieving, from the database 116, data objects responsive to the database-access request (e.g., in the context of a search request, relevant to the search terms), as well as ranking the responsive data objects in accordance with the ranking conditions. The query engine 506 may include functionality for evaluating each of the WHERE conditions for each data object, computing an overall score for the data object based on the weights associated with the various conditions, and then ordering the data objects by that score (as reflected in the above SELECT statements by the phrase "ORDER BY score DESC"). The ranked data objects are then returned to the database-accessing service module 408 (operation 614). In accordance with various example embodiments, the ranking of the retrieved data objects is user-dependent. Such user-dependency can be achieved, for instance, by storing, for each object type, not a single ranking configuration 532, but multiple user-specific ranking configurations for multiple respective users or groups of users. The ranking configurations for different users can vary in the assignment of ranking dimensions to object types, in the attribute values and associated significance weights for each assigned dimension, and/or in in the ranking impact weights associated with the ranking dimensions. In some example embodiments, the ranking impact weights and/or the assignment of ranking dimensions to object types are fixed across all users and not eligible for user-specific adjustments, limiting user-dependent configuration to the selection of attribute values and associated significance weights.

In one example embodiment, users can create their own ranking configurations, e.g., via the configuration console 512, by selecting ranking dimensions for each object type, and specifying attribute values and associated significance weights. In another example embodiment, the ranking configurations for different user or groups of users are set by an administrator. For example, an administrator of the database 112 for an organization may create ranking configurations for users grouped based on departmental affiliation, job descriptions, or similar criteria. Furthermore, in some embodiments, a user or administrator assigns ranking dimensions, but the attribute values that result in boosting and/or the associated significance weights are not explicitly specified in the ranking configuration, but dynamically determined at runtime, as explained in more detail below as well as in co-pending application entitled "Ranking Based on Dynamic Contextual Information.

User-dependent ranking can also be achieved by using ranking dimensions that contain, as one of the object attributes affecting the ranking, a user identifier (ID). Data objects may, for example, store, as one object attribute, the user ID of the user who created the data object in the database, or who last modified the data object, or who "owns" the data object for other reasons. Assuming that users are primarily interested in their own data objects, a ranking condition may then take the form:

```
WHERE (userID="MyID" [weight=0.7] OR userID !=
    "MyID"weight=0.1])
```

Herein, "MyID" corresponds to a variable name in the ranking configurations that is to be substituted at runtime with the user ID of the user who issued the database-access request (or on behalf of whom the database-access request was issued). In other words, "MyID" is a dynamic parameter that is to be evaluated or resolved prior to building the ranking condition for the database query 204.

In some instances, the user ID is not directly stored as an object attribute within data objects of the type of interest, but the data objects store one or more other attributes that depend on the user. For example, data objects may store the cost center, department, or facility to which they pertain. Each user may be affiliated with a particular such cost center, department, or facility, as may be reflected, in user data 534 stored in the database 116. In order to boost data objects that are particular relevant to the user by virtue of, for example, being associated with the user's cost center, a ranking condition of the following form may be used:

WHERE (cost_center="MyCostCenter" [weight=0.7] OR cost_center !="MyCostCenter" [weight=0.1])

Herein, "MyCostCenter" is a variable name in the ranking configuration 532 that is to be substituted at runtime by the cost center of the user who issued the database-access request (or on behalf of whom the database-access request was issued), as ascertained based on the user ID in conjunction with the user data 534. "MyCostCenter" is to be resolved prior to building the ranking condition for the database query 204. An alternative approach to implement the same ranking criterion is to define a join that links the result item to be found with a table that defines the link between cost centers and users (provided the anchor item contains cost center information). Then, the session user identifier as "MyID" can be set as a condition on the user attribute of the latter table. If the user actually is assigned to the item's cost center, the condition is met and the join works. Otherwise, the condition breaks, and hence the boosting will not be applied.

Furthermore, user data need not be static (as is, e.g., the user's cost center), but can be dynamic. For example, the user's interactions with data objects stored in the database 116 may be tracked, and frequently viewed data objects may be ranked higher than others. A suitable WHERE condition would look like:

WHERE (object_id="MostViewed" [weight=0.7] OR object_id !="MostViewed" [weight=0.1])

Herein, "MostViewed" is a variable in the ranking configuration 532 that is to be substituted at runtime with the key (that is, the identifier) of the data object (of the specified type) that has received the most views by the specified user, as determined based on the user-interaction tracking data. As will be appreciated, multiple values corresponding to the most-viewed data object, second-most viewed data object, and so on may be specified, optionally with successively decreasing weights.

Figure 7:
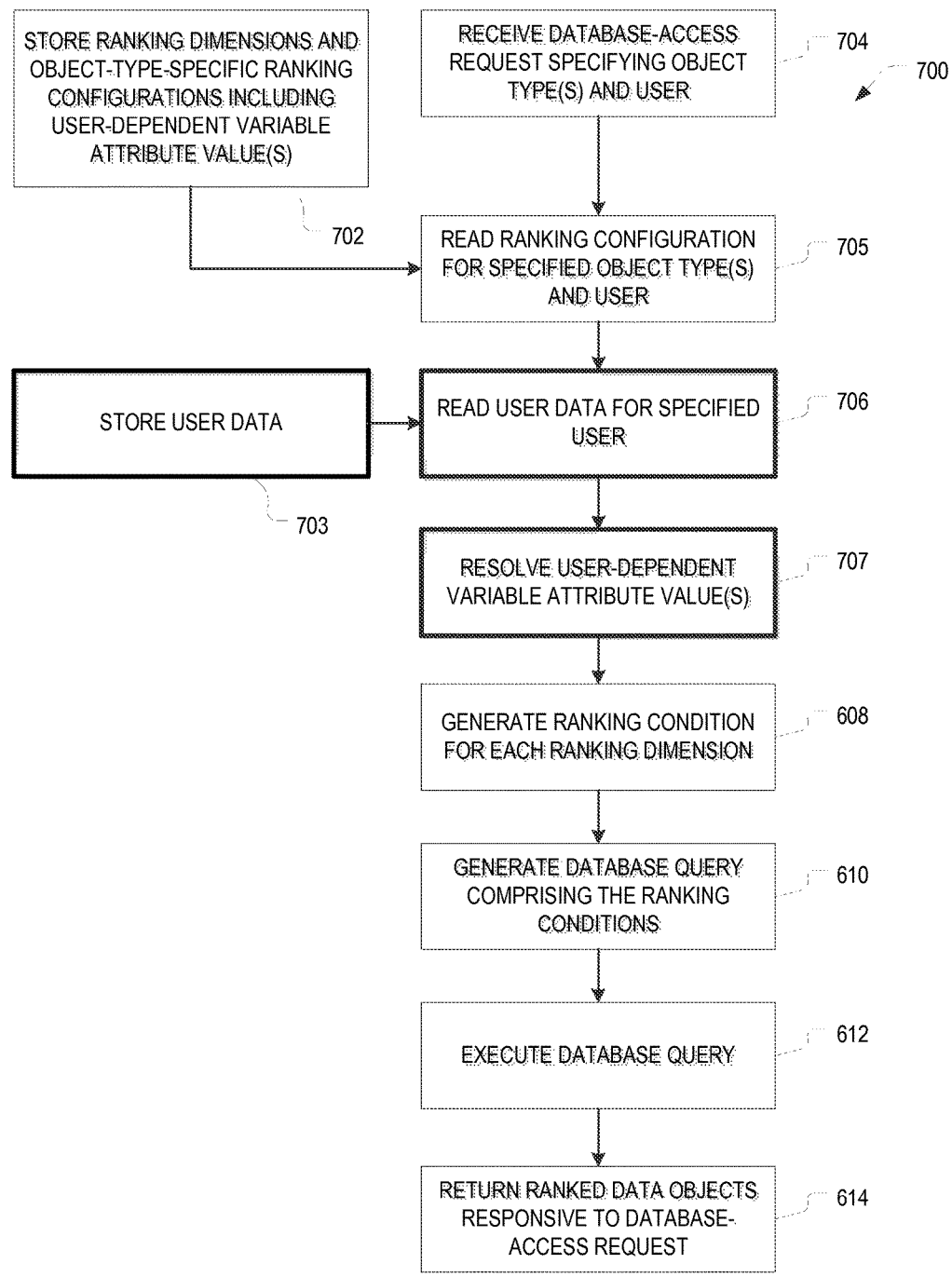
FIG. 7 is a flow chart of an example method, in accordance with various embodiments, for the user-dependent ranking of data objects retrieved from a database based on object attributes.

FIG. 7 is a flow chart of an example method 700, in accordance with various embodiments, for the user-dependent ranking of data objects retrieved from a database based on object attributes. The method involves storing ranking dimensions 530 and object-type-specific and optionally user-specific ranking configurations 532 that may be include user-dependent, variable attribute values (operation 702). In addition, the method 700 involves storing user data 534 (operation 703), such as a table of user profiles that identifies each user by her user ID and includes one or more attributes of the user, such as the department or cost center to which she belongs, the facility or location where he works, the job title or level of authorization, the user's interactions history with the data objects, etc. In this manner, the user data 534 provides a mapping between user IDs and associated values of user-dependent variables that may be used in the ranking configurations. Like the ranking dimensions 530 and ranking configurations 532, the user data 534 may, but need not be stored in the database 116.

At operation 704, a database-access request that specifies one or more object types as well as the user is received at the query builder module 412. The user may be specified, for instance, in terms of his user ID, which may be determined from login data. In embodiments where ranking configurations are specific to groups of users (rather than individual users), the user ID is resolved to ascertain the group of user of which the identified user is a member. Upon receipt of the database-access request 520, the ranking configuration(s) 532 for the specified user or group of users and the specified object type(s) are read by the query builder module 412 (operation 705).

The query builder module 412 further reads the user data 534 for the specified user (operation 706), and resolves the user-dependent variable attribute values in the ranking configurations 532 based on the user data 534 (operation 707). Put differently, the query builder module 412 selects, based on the user ID and the mapping between user IDs and associated values of the user-dependent variable, the value associated with the specified user. In some cases, this selection involves more than a simple one-step look-up. For example, in order to ascertain the user's most-viewed data object, the query builder may read the user-interaction data for the specified user, which may list pairs of data objects (identified by their keys) and associated numbers of views, rank the data objects by the number of views, and then determine the key(s) of the most-viewed data object(s).

From the ranking dimensions 530 and ranking configurations 532 with the resolved attribute values, a ranking condition is generated for each ranking dimension assigned to the specified object type (operation 708), in the same manner as is done for user-independent ranking dimensions. For example, for ranking based on the cost center of the data objects, the query builder module 412 may look up the cost center of the user in the user data 534 and substitute that cost center (say, "CostCenter1") for the variable name "MyCost-Center" (operation 707) to build the following ranking condition in operation 708:

WHERE (cost_center="CostCenter1" [weight=0.7] OR cost_center !="CostCenter1" [weight=0.1])

As another example, for ranking based on the user's interaction history, the query builder module 412 may determine the data object that has been most frequently viewed by the user, and substitute the key of that data object (say, "1562") for the variable name "MostViewed" (operation 707) to build the following ranking condition in operation 708:

WHERE (object_id="1562" [weight=0.7] OR object_id !="1562" [weight=0.1])

Once the individual ranking conditions, one of which may be user-dependent, have been formed in in operation 608, a database query 204 including these ranking conditions is generated (operation 610) and executed (operation 612) in the same manner as for user-independent ranking. A ranked set of data objects responsive to the database-access request 614, which generally differs between users as a result of user-dependent attribute values and/or user-specific ranking configurations 532, can then be returned (operation 614).

Figure 8:
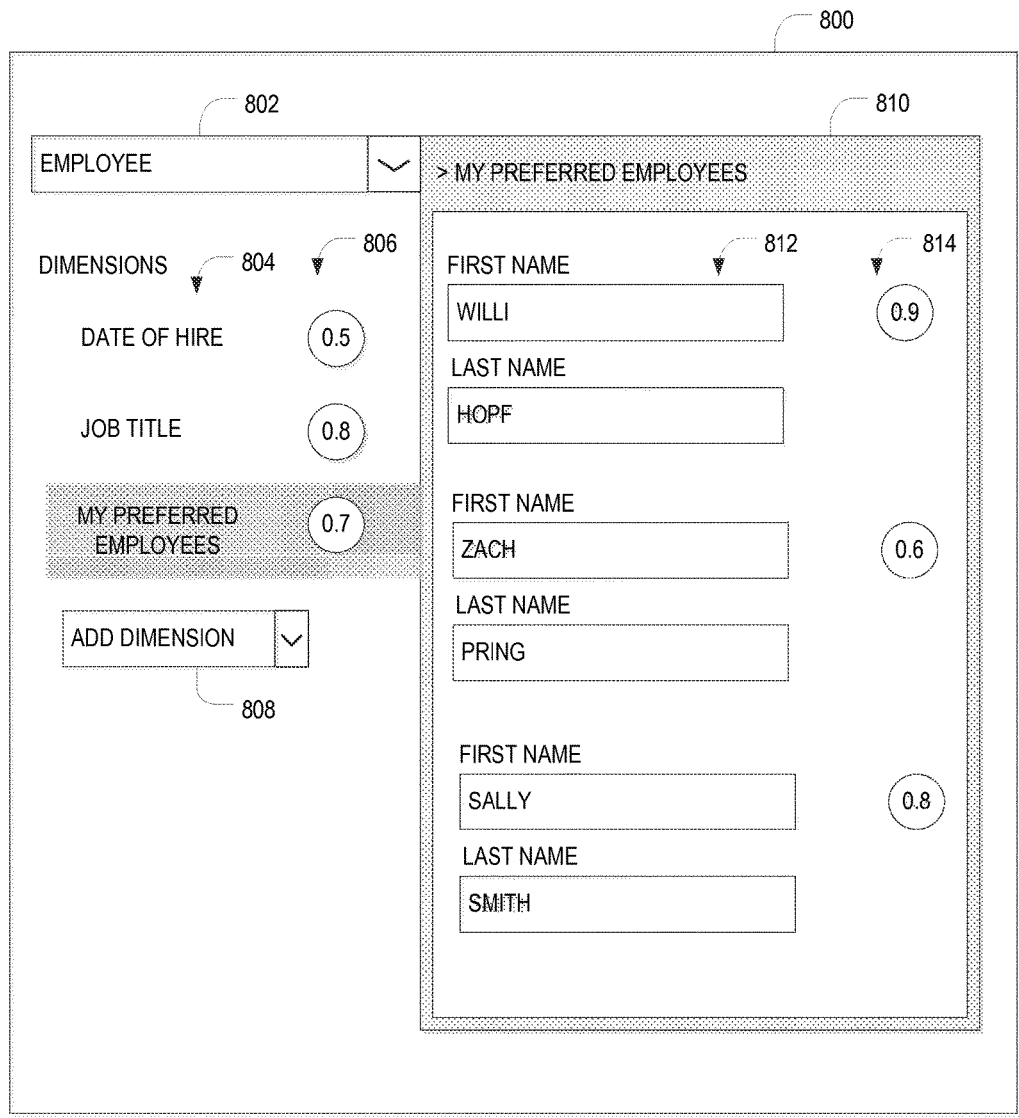
FIG. 8 is an example user interface diagram illustrating a ranking-configuration console in accordance with an example embodiment.

FIG. 8 is an example user interface diagram illustrating a ranking-configuration console 512 in accordance with an example embodiment. The user interface 800 may include a drop-down menu 802 for selecting an object type for which the ranking configuration is to be specified. In the instant example, the selected object type is "Employee." Below the selected object type, the ranking dimensions 804 already assigned to that object type are listed, along with the specified ranking-impact weights 806. In the example illustrated, employees will be ranked, in order of decreasing impact, based on their job titles, a list of named preferred employees, and the dates of hire. The user may add further ranking dimensions via a dimension drop-down menu 808. Upon selection of a particular one of the assigned dimensions, as shown for the dimension "My Preferred Employees," a dialog 810 allows the user to specify, e.g., via text input fields 812 (or, alternatively, drop-down selections), the object attribute values that are to result in boosting of a data object. For example, preferred employees may be specified in terms of the combination of their first and last names. Next to the sets of attribute values, the associated significance weights 814 can be specified. As will be readily appreciated, the illustrated user interface 800 is merely one example for implementing a ranking-configuration console 512 that allows manual specification of ranking dimensions. Alternative user interfaces may differ, e.g., in the types and arrangements of user-interface elements or the sequence of screens or windows that appear to guide the user through the configuration process.

Using weighting as described above with reference to FIGS. 6 and 7, the results of a database-access request 520 are not modified in the number of items, but in the order, or ranking, of these items. As mentioned, the weighting based on object data (optionally user-dependent) in accordance herewith can naturally integrate with other types of ranking (e.g., an original ranking), because the weights can be internally balanced against the weights in the original ranking, e.g., as computed based on relevancy to search terms. Thus, using weights in database queries, e.g., included in WHERE conditions, provides for query extensions that retain the result set as unchanged in number while changing the ranking of items in the search result, e.g., by boosting result entries having desired values of object attributes.

FIGS. 9A and 9B illustrate example unranked and ranked query results, in accordance with an example embodiment. The ranked query results in FIG. 9B contain the same data items as the unranked query results in FIG. 9A, but the order of the data items in the ranked query results is different from that of the unranked query results. The difference in order between the ranked results and the unranked results is caused by the weights in the weighted search query, which causes data items where WorkArea="Sales" and ObjectID="217, 317" to be ranked higher. For example, the first six data items appear at the top of the result set, as the "Work Area" and "ObjectID" columns are effectively weighted, forcing the corresponding result data items to appear first. Values of the other columns ("Location," "Employee," "Product," and "Amount") do not affect the ranking in this example.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 10:
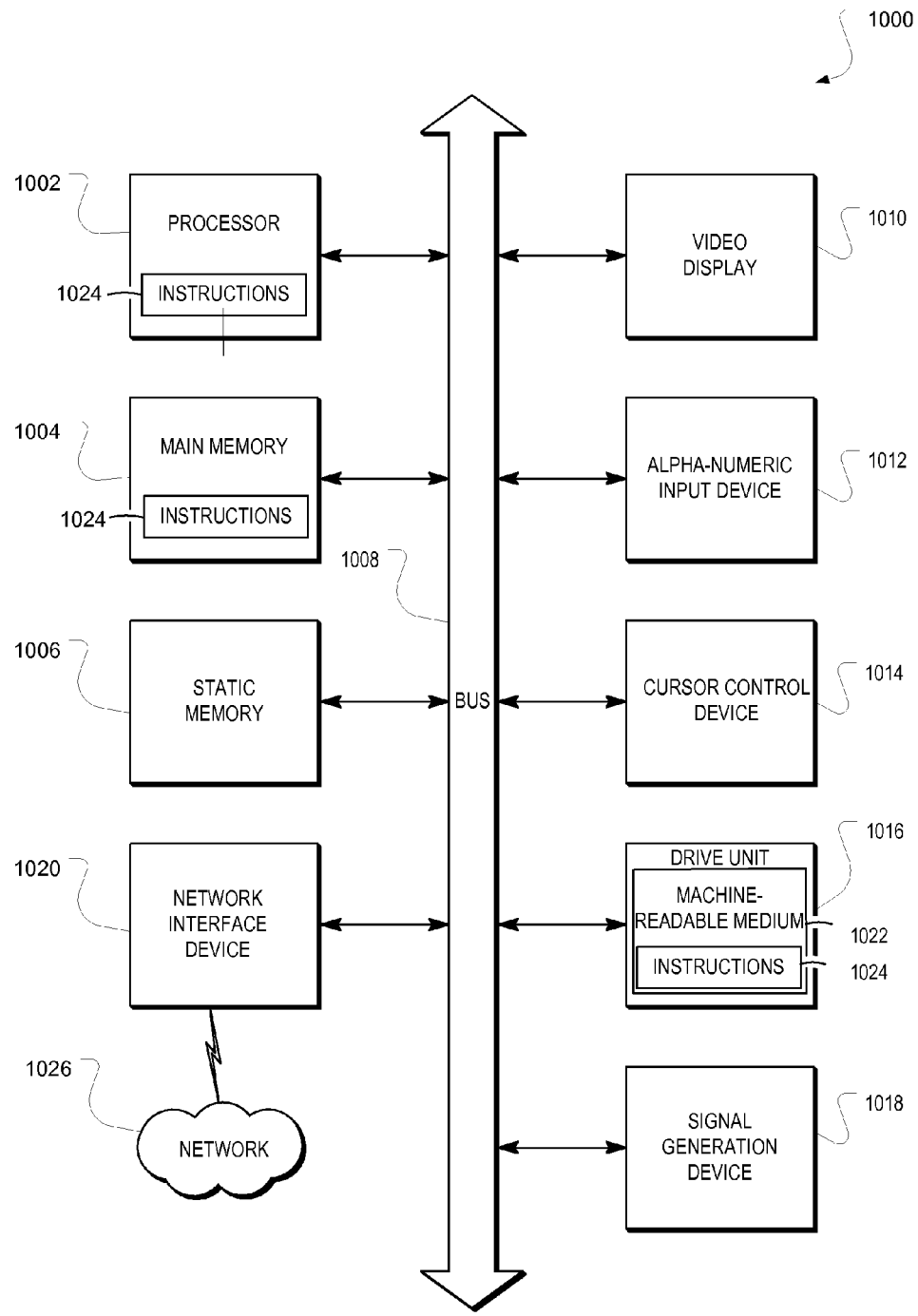
FIG. 10 is a block diagram of a computer processing system within which a set of instructions may be executed for causing a computer to perform any one or more of the methodologies discussed herein.

FIG. 10 is a block diagram of a computer processing system 1000 within which a set of instructions 1024 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1000 includes a processor 1002 (e.g., a central processing unit (CPU), a graphics processing unit (GPU), or both), a main memory 1004, and a static memory 1006, which communicate with each other via a bus 1008. The computer processing system 1000 may further include a video display 1010 (e.g., a plasma display, a liquid crystal display (LCD), or a cathode ray tube (CRT)). The computer processing system 1000 also includes an alphanumeric input device 1012 (e.g., a keyboard), a user interface (UI) navigation device 1014 (e.g., a mouse and/or touch screen), a drive unit 1016, a signal generation device 1018 (e.g., a speaker), and a network interface device 1020.

The drive unit 1016 includes a machine-readable medium 1022 on which is stored one or more sets of instructions 1024 and data structures embodying or utilized by any one or more of the methodologies or functions described herein. The instructions 1024 may also reside, completely or at least partially, within the main memory 1004, the static memory 1006, and/or within the processor 1002 during execution thereof by the computer processing system 1000, the main memory 1004, the static memory 1006, and the processor 1002 also constituting tangible machine-readable media 1022.

The instructions 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any medium that is capable of storing, encoding, or carrying a set of instructions 1024 for execution by the computer and that cause the computer to perform any one or more of the methodologies of the present application, or that is capable of storing, encoding, or carrying data structures utilized by or associated with such a set of instructions 1024. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method for ranking data objects retrieved from a database, the method comprising:

storing, in one or more machine-readable media, one or more ranking configurations, each ranking configuration comprising an assignment of at least one ranking dimension specifying a set of one or more object attributes to an object type associated with the ranking configuration and, for each of the at least one ranking dimension, one or more sets of values associated with the set of object attributes and significance weights assigned to the respective sets of values, at least one of the sets of values comprising a user-dependent variable; and by at least one processor, in response to a database-access request specifying an object type and a user, reading a ranking configuration associated with the specified object type;

resolving the user-dependent variable based at least in part on the specified user;

generating a ranking condition for each of the ranking dimensions assigned to the object type based at least in part on the set of object attributes and the one or more sets of values and associated significance weights, the one or more sets of values comprising the resolved user-dependent variable;

generating a database query for data objects of the specified object type, the query comprising the generated ranking conditions to cause ranking of the data objects at least in part based on values, in the data objects, of the object attributes specified in the one or more assigned ranking dimensions in conjunction with the associated significance weights;

executing the database query to retrieve the data objects of the specified object type; and presenting the ranked data objects ordered according to the ranking of the data objects based at least in part on the values, in the data objects, of the object attributes specified in the one or more assigned ranking dimensions in conjunction with the associated significance weights.

2. The method of claim 1, wherein the user-dependent variable is a user identifier.

3. The method of claim 1, further comprising storing, in the one or more machine-readable media, a mapping between user identifiers and associated values of the user-dependent variable, wherein resolving the user-dependent variable comprises selecting, based on an identifier of the specified user in conjunction with the mapping, one of the associated values.

4. The method of claim 3, wherein the mapping between user identifiers and associated values of the user-dependent variable is static.

5. The method of claim 3, wherein the mapping between user identifiers and associated values of the user-dependent variable is dynamic.

6. The method of claim 5, wherein the mapping between user identifiers and associated values of the user-dependent variable is based on user-interaction data.

7. The method of claim 1, wherein the one or more ranking configurations are user-specific, and wherein the ranking configuration being read is specific to the user specified in the database-access request.

8. The method of claim 7, wherein a plurality of ranking configurations specific to a plurality of respective users and associated with a common object type share a common assignment of the at least one ranking dimensions to the object type and differ in at least one of the at least one set of values associated with the set of object attributes or the significance weights assigned to the respective sets of values.

9. The method of claim 8, further comprising defining the user-specific ranking configurations manually.

10. The method of claim 1, wherein the at least one ranking dimension is stored separately from the ranking configurations, whereby re-use of ranking dimensions between multiple ranking configurations is enabled.

11. The method of claim 1, wherein each of the plurality of ranking dimensions further specifies an associated ranking-impact weight, the ranking conditions in the database query being weighted in accordance with the respective ranking-impact weights.

12. A system comprising:
one or more processors;
a hardware-implemented query builder module configured to cause the one or more processors to, in response to a database-access request specifying an object type and a user,
read an object-type-specific ranking configuration for the specified object type, the ranking configuration comprising an assignment of at least one ranking dimension specifying a set of one or more object attributes to an object type associated with the ranking configuration and, for each of the at least one ranking dimension, one or more sets of values associated with the set of object attributes and significance weights assigned to the respective sets of values, at least one of the sets of values comprising a user-dependent variable;
resolve the user-dependent variable based at least in part on the specified user;
generate a ranking condition for each of the ranking dimensions assigned to the object type based at least in part on the set of object attributes and the one or more sets of values and associated significance weights, the one or more sets of values comprising the resolved user-dependent variable; and
generate a database query for data objects of the specified object type, the query comprising the generated ranking conditions to cause ranking of the data objects at least in part based on values, in the data objects, of the object attributes specified in the one or more assigned ranking dimensions in conjunction with the associated significance weights; and
a hardware-implemented database query engine, communicatively coupled to the hardware-implemented query builder module, configured to cause the one or more processors to:
execute the database query to retrieve the data objects of the specified object type; and
present the ranked data objects ordered according to the ranking of the data objects based at least in part on the values, in the data objects, of the object attributes specified in the one or more assigned ranking dimensions in conjunction with the associated significance weights.

13. The system of claim 12, further comprising:
a database storing the data objects, the ranking configurations, and the user data.

14. The system of claim 13, wherein the user data comprises a mapping between user identifiers and associated values of the user-dependent variable, wherein the query builder module is configured to resolve the user-dependent variable by selecting, based on an identifier of the specified user in conjunction with the mapping, one of the associated values.

15. The system of claim 12, wherein the user-dependent variable is a user identifier.

16. The method of claim 12, wherein the user-dependent variable is dynamic.

17. The system of claim 12, further comprising a ranking configuration console comprising a user interface to receive manual input for the user-dependent specification of at least one of the assigned at least one ranking dimension, the at least one set of values associated with the set of object attributes of the at least one ranking dimension, or the significance weight associated with the at least one set of values.

18. A machine-readable medium storing instructions which, when executed by one or more hardware processors, cause the one or more hardware processors to:

read an object-type-specific ranking configuration for the specified object type, the ranking configuration comprising an assignment of at least one ranking dimension specifying a set of one or more object attributes to an object type associated with the ranking configuration and, for each of the at least one ranking dimension, one or more sets of values associated with the set of object attributes and significance weights assigned to the respective sets of values, at least one of the sets of values comprising a user-dependent variable;

resolve the user-dependent variable based at least in part on the specified user;

generate a ranking condition for each of the ranking dimensions assigned to the object type based at least in part on the set of object attributes and the one or more sets of values and associated significance weights, the one or more sets of values comprising the resolved user-dependent variable;

generate a database query for data objects of the specified object type, the query comprising the generated ranking conditions to cause ranking of the data objects at least in part based on values, in the data objects, of the object attributes specified in the one or more assigned ranking dimensions in conjunction with the associated significance weights;

execute the database query to retrieve the data objects of the specified object type; and present the ranked data objects ordered according to the ranking of the data objects based at least in part on the values, in the data objects, of the object attributes specified in the one or more assigned ranking dimensions in conjunction with the associated significance weights.

* * * * *